(12) United States Patent
Holden et al.

(10) Patent No.: US 8,799,217 B2
(45) Date of Patent: Aug. 5, 2014

(54) SERVER REPLICATION AT DIFFERENT SITES

(75) Inventors: Russell Holden, Boxborough, MA (US); William A Spencer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 13/172,777

(22) Filed: Jun. 29, 2011

(65) Prior Publication Data

US 2013/0006928 A1    Jan. 3, 2013

(51) Int. Cl.
- *G06F 7/00* (2006.01)
- *G06F 17/00* (2006.01)

(52) U.S. Cl.
USPC ............................ 707/614; 707/622; 707/637

(58) Field of Classification Search
USPC .......................................... 707/614, 622, 637
See application file for complete search history.

(56) References Cited

U.S. PATENT DOCUMENTS

| | | | | |
|---|---|---|---|---|
| 5,832,225 | A * | 11/1998 | Hacherl et al. | 709/223 |
| 5,968,121 | A * | 10/1999 | Logan et al. | 709/219 |
| 6,523,036 | B1 | 2/2003 | Hickman et al. | |
| 7,814,499 | B2 | 10/2010 | Straube et al. | |
| 7,853,561 | B2 | 12/2010 | Holenstein et al. | |
| 7,917,513 | B2 | 3/2011 | Watanabe et al. | |
| 7,921,268 | B2 | 4/2011 | Jakob | |
| 2011/0161289 | A1* | 6/2011 | Pei et al. | 707/613 |
| 2011/0246519 | A1* | 10/2011 | Jansen | 707/770 |
| 2011/0252124 | A1* | 10/2011 | Bonner et al. | 709/224 |
| 2012/0079502 | A1* | 3/2012 | Kwan et al. | 718/106 |

* cited by examiner

*Primary Examiner* — Kimberly Wilson
(74) *Attorney, Agent, or Firm* — Jordan IP Law, LLC

(57) ABSTRACT

A method, device, and program product are provided for inter-site database replication. A replicating server tracks other servers that it needs to replicate with and the sites where the other servers are located. In response to an indication to replicate, the replicating server determines whether each of the other servers is at the same location as the replicating server or a different location from the replicating server. The replicating server replicates with each of the other servers at the same site as the replicating server, and the replicating server replicates with only one of the servers at each different site. The replicated server at each different site replicates with the other servers at the site of the replicated server.

17 Claims, 5 Drawing Sheets

SERVER REPLICATION AT DIFFERENT SITES

FIELD OF THE INVENTION

The invention relates to the field of computer systems and more particularly to a method, system, and program product for replication of servers at different sites.

BACKGROUND

In computer networks, databases are often replicated on multiple servers to provide better access to them. In configurations where there is a local site of servers having replicas of databases and one or more remote sites of servers having replicas of the same databases, the local and remote sites are connected by an inter-site connection, typically by a Wide Area Network (WAN) connection. When replication occurs among the servers, the replication of servers at the remote location is performed across the inter-site connection. It is likely that the replication data will be sent across the inter-site connection multiple times. Inter-site connections, such as WAN connections typically have limited bandwidth compared to connections within a site. Moreover, there is often a cost based on usage of an inter-site connection. Therefore, it is desirable to minimize the frequency of sending data from one site to another during database replication.

SUMMARY

A method, device, and program product are provided for server replication to a remote site that minimizes data transmission across an inter-site connection. By tracking other servers to be replicated with, as well as the sites where the other servers are located, a replicating server can replicate with only one server at each other site minimizing the transmission of replication data across an inter-site connection.

According to one embodiment, a method is provided for inter-site database replication. A replicating server tracks other servers that it needs to replicate with and the sites where the other servers are located. In response to an indication to replicate, the replicating server determines whether each of the other servers is at the same location as the replicating server or a different location from the replicating server. The replicating server replicates with each of the other servers at the same site as the replicating server, and the replicating server replicates with only one of the servers at each different site. The replicated server at each different site replicates with the other servers at the site of the replicated server.

In one embodiment, the step of the replicating server replicating with only one of the other servers at each different site, comprises: the replicating server creating an ordered site list of servers for each remote site with servers that the replicating server needs to replicate with; the replicating server attempting to replicate with a first one of the servers on each one of the ordered site lists of servers; the replicating server discontinuing replication with servers on each of the site lists of servers with a successful replication; and the replicating server attempting to replicate with a next one of the ordered servers on each of the ordered site lists of servers without a successful replication.

In one embodiment, the ordered site list is creating by hashing a combination of each remote server name and each replicated database name.

In one embodiment, the step of a replicating server tracking other servers that it needs to replicate with and the sites where said other servers are located, comprises: storing the names of databases to be replicated, the names of servers to be replicated with for each database, and the site for each server; and retrieving the stored database names, server names and server sites for each replicated database.

In one embodiment the names of databases to be replicated, the names of servers to be replicated with for each database, and the site for each server are stored on a look up table.

In one embodiment, the step of the replicating server determining whether each of the other servers is at the same location as the replicating server or a different location from the replicating server, comprises: storing site indications for each server to be replicated with; and comparing the stored site indications.

In one embodiment, the indication to replicate comprises determining that a change has been made to a database.

In one embodiment, the step of the replicated server at each different site replicates with the other servers at the site of the replicated server comprises: the replicated server determining whether the replicated server has been replicated from the same site or a different site; upon determining that the replicated server has been replicated from a different site, the replicated server identifying other servers at the site of the replicated server to be replicated with; and the replicated server replicating with the identified other servers at the site of the replicated server.

According to one embodiment of the present invention a computer system is provided for inter-site database replication. The computer system comprises a plurality of networked servers. Each of the plurality of servers includes at least one processor. At least one memory is operably connected to the at least one processor in each of the plurality of servers. A program of instruction is encoded on the at least one memory of each of the plurality of servers and is executable by the processor of each of at least one processors of the each of the plurality of servers. The program of instruction comprises: program instructions to track other servers that the server needs to replicate with and the sites where the other servers are located; program instructions to determine whether each of the other servers is at the same location as the server or a different location from the server in response to an indication to replicate; program instructions to replicate with each of the other servers at the same site as the server; program instructions to replicate with only one of the servers at each different site; and program instructions to replicate with each other server at the same site upon being replicated by a server from a different site.

In one embodiment the servers are connected with servers at a different site by a WAN connector.

In one embodiment, the computer system further comprises an ordered site list of servers for each remote site for each replicated database encoded on the at least one memory of each server. The ordered site list identifies, for the respective site, each server at the site to be replicated with and an order for replication of each server.

In one embodiment, the program of instruction further comprises: program instructions to create the ordered site lists of servers; program instructions to replicate with a first one of the servers on each one of the ordered site lists of servers; program instructions to discontinue replication with servers on each of the site lists of servers with a successful replication; and program instructions to replicate with a next one of the ordered servers on each of the ordered site lists of servers without a successful replication.

In one embodiment, a look up table is encoded on the at least one memory of each server. The look up table identifies each database to be replicated, each server with the database to be replicated, and a site where each server is located.

In one embodiment, the program of instruction further comprises: program instructions to store the names of databases to be replicated, the names of servers to be replicated with for each database, and the site for each server on the look up table; and program instructions to retrieve the stored database names, server names and server sites for each replicated database from the look up table.

In one embodiment, the program of instruction further comprises: program instructions to determine whether a replicated server has been replicated from the same site or a different site; program instructions to identify other servers at the site of the replicated server to be replicated with, upon determining that the replicated server has been replicated from a different site; and program instructions to replicate with the identified other servers at the site of the replicated server.

According to one embodiment of the present invention, a program product is provided, comprising a tangible computer readable storage device having encoded thereon a computer executable program of instructions. The program of instructions comprises: program instructions to track, on a server, other servers that the server needs to replicate with and the sites where the other servers are located; program instructions to determine whether each of the other servers is at the same location as the server or a different location from the server in response to an indication to replicate; program instructions to replicate with each of the other servers at the same site as the server; program instructions to replicate with only one of the servers at each different site; and program instructions to replicate with the other servers at the site of the server upon being replicated with by a server from a different site.

In one embodiment, the program instructions to replicate with only one of the other servers at each different site, comprise: program instructions to create an ordered site list of servers for each remote site with servers that the server needs to replicate with; program instructions to replicate with a first one of the servers on each one of the ordered site lists of servers; program instructions to discontinue replication with servers on each of the site lists of servers with a successful replication; and program instructions to replicate with a next one of the ordered servers on each of the ordered site lists of servers if there was not a successful replication with servers higher in the list.

In one embodiment, the program instructions to track other servers that the server needs to replicate with and the sites where the other servers are located, comprise: program instructions to store names of databases to be replicated, names of servers to be replicated with for each database, and the site for each server; and program instructions to retrieve the stored database names, server names and server sites for each replicated database.

In one embodiment, the program instructions to determine whether each of the other servers is at the same location as the server or a different location from the server, comprise: program instructions to store site indications for each server to be replicated with; and program instructions to compare the stored site indications.

In one embodiment the program instructions to replicate with the other servers at the site of the server when the server is replicated from a different site comprise: program instructions to determine whether the server has been replicated from the same site or a different site; program instructions to identify other servers at the site of the server to be replicated with upon determining that the server has been replicated from a different site; and program instructions to replicate with the identified other servers at the site of the server.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, system, and program product for inter-site database replication. According to an embodiment of the present invention, a network of servers is located across two or more sites. The networks at different sites are connected by an inter-site connector, such as a WAN. A replicating server tracks other servers that it needs to replicate with and the sites where these other servers are located. Existing data replication programs exist that track other servers that a server needs to replicate with. In the present invention, a replication program of instruction further includes tracking where these other servers are located. This can be done by a number of different means. One is that each server can "know" based on configuration information, server name encoding, or addressing what site IT is in. Then, the server can communicate this information to other servers. Another is to have a central directory of server inventory information which would include the other servers, and the sites where they are located.

In response to an indication to replicate, the replicating server determines whether each of the other servers is at the same location as the replicating server or a different location from the replicating server. The replicating server replicates with each of the other servers at the same site as the replicating server. The replicating server replicates with only one of the servers at each different site. Then, the replicated server at each different site replicates with the other servers at the site of the replicated server.

Figure 1:
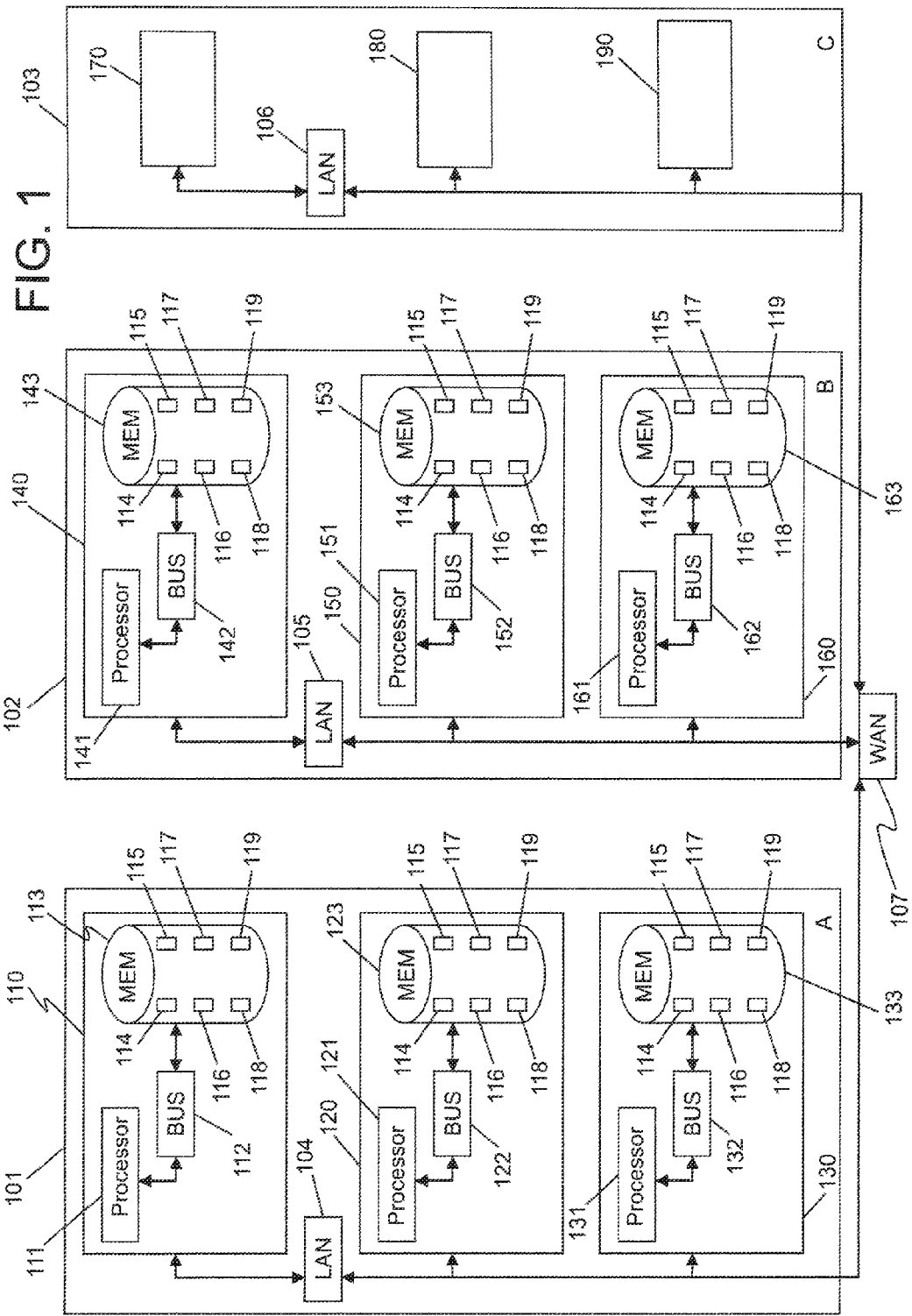
FIG. 1 is a block diagram of a computer system for server replication at a remote site that minimizes data transmission across an inter-site connection according to an embodiment of the present invention.

Referring now to FIG. 1, a block diagram of computer system for inter-site database replication according to an embodiment of the present invention is shown. The computer system is distributed over two or more physical locations or sites: site 101 ("A"), site 102 ("B"), site 103 ("C"). Each site A, B, C has one or more servers: 110, 120, 130; 140, 150, 160; 170, 180 190. Each server 110, 120, 130, 140, 150, 160, 170, 180, 190 has a processor 111, 121, 131, 141, 150, 161, 171, 181, 191. The processors 111-191 are operably connected with corresponding memory devices 113-193, respectively through a system bus 112-192, respectively or other means for transmitting electronic signals. The processors 111-191 may be any processing device or unit suitable for executing program code. According to one embodiment, processors 111-191 are one or more microprocessors.

The memories 113-193 may comprise Random access Memory (RAM), persistent memory, such as a hard drive, a CD-ROM, a DVD drive, a USB memory device, or the like, or a combination thereof.

In the replicating server 110, a replication application 114 is encoded on the memory 113. According to one embodiment of the present invention, each server 110-190 has a replication application 114-119, respectively encoded on its respective memory 113, 123, 133, 143, 153, 163, and any server may be the replicating server.

At each site A, B, C, the servers are connected by an intra-network connection 104, 105, 106, respectively, such as a Local Area Network LAN connector. The servers are connected to servers at other or remote sites by an inter-network connector 107, such as a WAN connector.

According to one embodiment, a database 118 is encoded on the memory 113, and the replication application 114 is executable by the processor 111 to replicate the database 118 with other servers 120-190. The database 118 may be on the same memory as the replication application 118 or on a different memory. Another database 119 may also be encoded on the memory 113.

Figure 2:
FIG. 2 is schematic representation of a table identifying replicated databases in a network according to an embodiment of the present invention.

The replication server 110 tracks other servers that it needs to replicate with and the sites where said other servers are located. The replication server may have a look up table 115 encoded on a memory 113, for example. An example look up table 115 is shown in FIG. 2. For each database, servers that host that database are listed and the site locations of those servers are listed. For example, for database abc123, servers 110, 120, 130, 140, 150, 160 and 170 are listed. Site A is listed for servers 110, 120, 130; Site B is listed for servers 140, 150 and 160. Site C is listed for server 170. Note, that the look up table may be replicated on other servers in the network.

Alternatively, the servers may communicate between themselves, sharing the information about what replicas each contains. Each database replica set will typically have some unique ID that all replicas of the same database share. When servers interact and share the replicas that they have on the local server, other servers can learn where the other replicas exist. Yet another option would be to hard code or provide the replica information in configuration documents.

In response to an indication to replicate, the replicating server 110 determines whether each of the other servers to be replicated with is at the same location as the replicating server or a different location from the replicating server. The indication to replicate may be a change occurring at the replicating server, for example. According to one embodiment, the replication application 114 checks the look up table 115 to identify other servers with replicated database abc123 and the sites where the servers are located.

Servers know if a database has changed since the last replication with a particular server. If something has changed in the database since the last successful replication between server pairs, it is an indication that replication must be initiated. Replication can be triggered by a number of means. The indication to replicate can be event driven (i.e. when something changes, queue it for replication), or can be time driven (i.e. replicate when a set period of time has elapsed since the last replication).

In the illustrated example, for database abc123, the tracked other servers and sites are: servers 120 and 130 at site A, servers 140, 150, and 160 at site B, and server 170 at site C.

The replicating server 110 replicates with each of the other servers at the same site as the replicating server. In the illustrated example, the replicating server 110 replicates with server 120 and 130 that are at site A with replicating server 110.

The replicating server 110 also replicates with only one of the servers at each different site. In the illustrated example, the other servers 140, 150 160 are at site B. Therefore, only one of these other servers 140, 150, 160 is replicated with replicating server 110. Also, other server 170 is the only other server to be replicated with at site C and is therefore replicated with replicating server 110. Thus, the data for replication is transmitted across the inter-site connection 107 only once for each remote site B, C.

The replicated server (150, 170) at each different site B and C, respectively replicates with the other servers (140 and 160 for server 150 and no other servers for server 170) at the site of the replicated server. The order of replication is determined by hashing the names for the "server" and the "database", then ordering the hashed values. So, if there are replicas for multiple databases shared between server A1 and server B1, B2, and B3, the server that A1 chooses will be different for each database. So, the order column in table 3 will depend on the database, and will be different for different databases.

Figure 3:
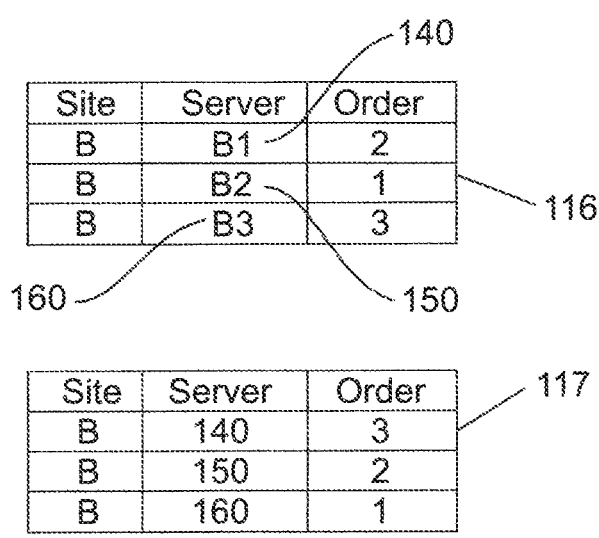
FIG. 3 is a schematic representation of ordered site lists of servers for sample databases for a database replication program according to an embodiment of the present invention.

According to one embodiment, the replicating server replicates with only one of the servers to be replicated with at each different site. In one embodiment, a server at each site is chosen to replicate with, through use of an ordered site list. The replicating server 110 creates an ordered site list of servers for each remote site with servers that the replicating server needs to replicate with for each database to be replicated. For example, an ordered site list 116 is created for a database abc123 at site B, as shown in FIG. 3. Another ordered site list 117 is created for another database def456 at site B. The ordered site lists 116, 117 are encoded on memory 113 or on a different memory connected with replicating server 110. Moreover, the ordered site lists may be incorporated into the look up table or may be stand alone data sets.

The replicating server 110 attempts to replicate with a first one of the servers 150 on each one of the ordered site lists 116 of servers for the replicated database abc123. The replicating server 110 discontinues replication with servers on each of the site lists of servers with a successful replication, and the replicating server 110 attempts to replicate with a next one of the ordered servers on each of the ordered site lists of servers without a successful replication.

According to one embodiment, the ordered site lists are created in a way that balances the replication load across multiple remote servers. For example, the ordered site lists 116, 117 may be created by hashing a combination of each remote server name and each replicated database name. For example, the database name abc123 from FIG. 2 is hashed with servers B1 140, B2 150, and B3 160, as follows:

H1=hash("B1abc123")
H2=hash("B2abc123")
H3=hash("B3abc123")

If H1=123, H2=012, and H3=333, then the servers 140, 150, 160 at site B might be listed in the order B2, B1, B3, as shown in ordered site list 116 in FIG. 3. In this example, the replicating server 110 will first try to replicate with the first ordered server B2 150.

To make the replication robust, the replication server will attempt to replicate with another server whenever replication with the first ordered server is unsuccessful. If the replication with the first ordered server B2 150 is successful, then the replicating server 110 is done with replications to site B. If server B2 150 is unavailable or the replication is unsuccessful, then the replicating server 110 will attempt to replicate with the next server in the ordered site list: B1 140. Similarly, if this replication is successful, then the replicating server 110 is done with replication to site B. If not, then the replicating server 110 will attempt to replicate with the next server on the ordered site list 116: B3. If at any point replication is successful with any server at site B, then replication to site B will stop, and the replicating server will not attempt to replicate with any other server at site B. Thus, the replication program of the present embodiment can easily adapt to servers being unavailable.

Different database names will produce different hash results. For example, for database def456, then hashing a combination of the database name and the server name will be:

H1=hash("B1def456")=333
H2=hash("B2def456")=222
H3=hash("B3def456")=111

For database def456 at site B, the site list order is B3 160, B2 150, B1 140 as shown in ordered site list 117 in FIG. 3.

The replicating program of instruction comprises instructions to determine that the server has been replicated from another site, and replicate with other servers at the same site.

Figure 4:
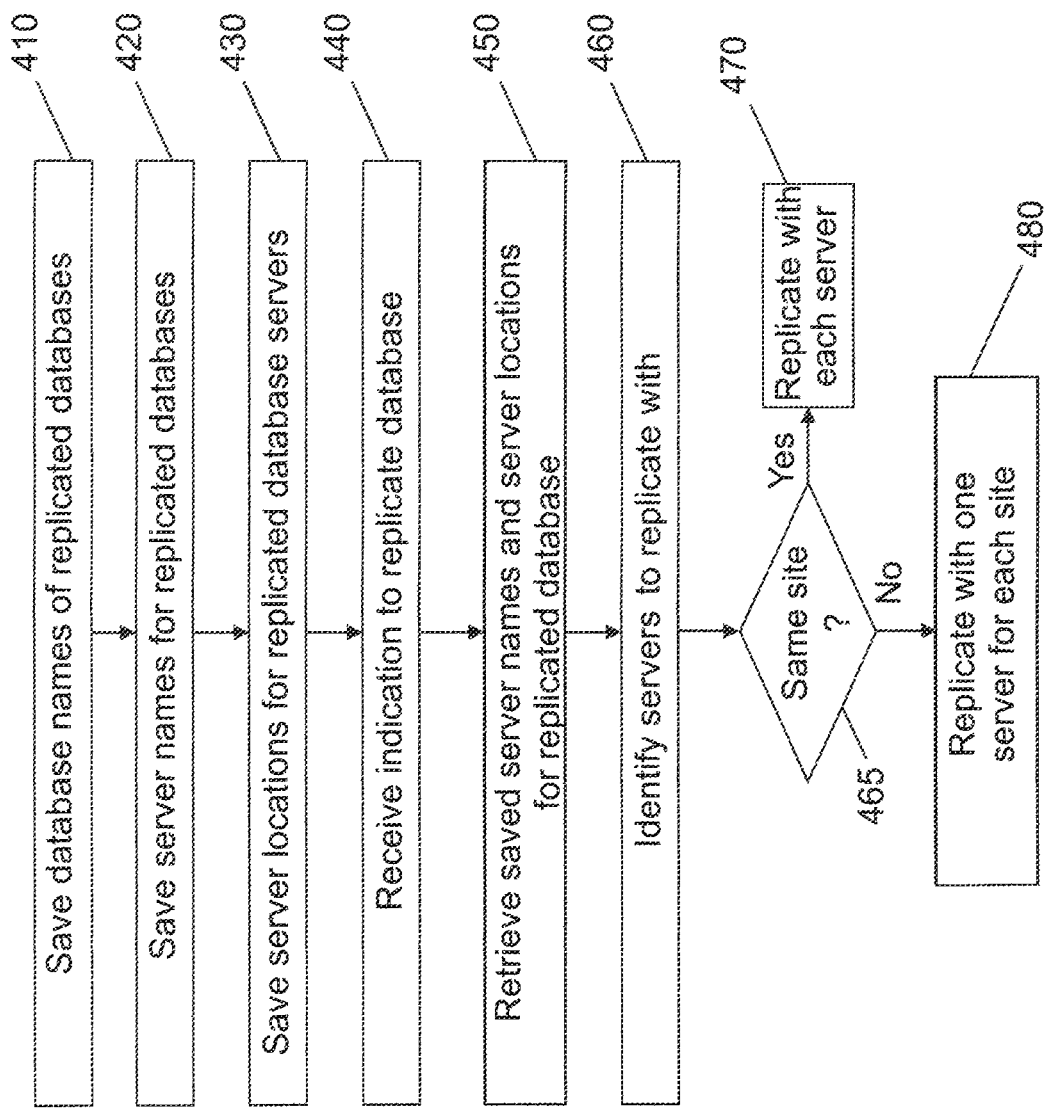
FIG. 4 is a flow diagram of a method for server replication at a remote site that minimizes data transmission across an inter-site connection according to an embodiment of the present invention.

FIG. 4 is a flow diagram of a method for server replication at a remote site that minimizes data transmission across an inter-site connection according to an embodiment of the present invention. The processor 111 on the replication server 110 executes program instructions in the replication application 114 to save database names of replicated databases (Step 410) and to save server names for servers with the replicated programs stored thereon (Step 420). According to one embodiment, the database names and server names are stored on a look up table 115. The locations of the servers whose names are saved are also saved (Step 430).

The replication application 114 receives an indication to replicate the replicated database (Step 440). The indication may be a signal triggered by a change to the database, for example.

Upon receiving the indication to replicate, the replication application retrieves saved server names and server locations for the replicated database (Step 450), and identifies servers that are to be replicated with (Step 460). The servers may be identified by querying the look up table 115 where each server with the database being replicated is listed by name, together with the site where the server is located.

The replication application 114 determines whether or not each identified server is at the same location as the replicating server or at a different location (Step 465). For example, the replication application 114 may compare the server sites from the look up table.

If the servers are determined to be from the same site (Y at step 465), then the replicating server 110 replicates with the other server 120, 130 (Step 470). If the servers are determined to be at different sites (N at step 465), then the replicating server 110 replicates with only one server for each different site (Step 480).

Figure 5:
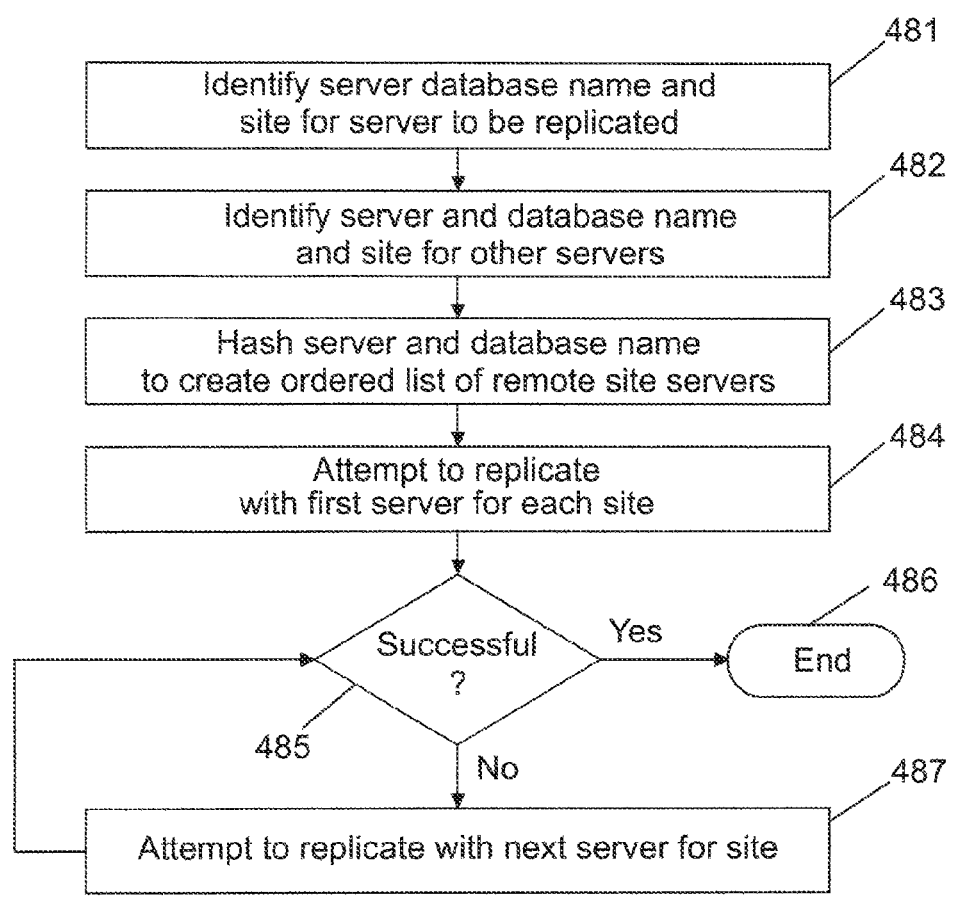
FIG. 5 is a flow diagram of a method for selecting and replicating with a single server at a remote site according to an embodiment of the present invention.

FIG. 5 is a flow diagram of step 480 from FIG. 4 in greater detail. In FIG. 5, a method is shown for selecting and replicating with a single server at a remote site according to an embodiment of the present invention. The replication application 114 identifies the server, database name, and site for the replicating server 110 (Step 481). Note that this is the information for the replicating server on which the replication application is running and may be retrieved from the look up table or the replicating server's register, for example. The replication application 114 identifies the server, database name, and site for each server to be replicated with (Step 482). This information may be retrieved from the look up table 115, for example.

The replication application 114 creates an ordered list for each site with servers having a specific database stored on them (step 483). As previously described, the ordered site lists may be created using a hash function to balance the replication load across the servers at a site. Note that steps 481-483 may be performed prior to receiving an indication to replicate (Step 440).

The replication application 114 attempts to replicate with the first server for each site (Step 484)—that is, the first server listed on each ordered site list or the server with the first order indicator.

The replication application 114 determines whether or not the replication is successful (Step 485). This may comprise sensing a replication successful signal from the other server, for example.

If the replication is successful (Y at step 485), then replication from the replicating server to that site stops (Step 486). If the replication is unsuccessful, such as the other server being unavailable, then the replicating server attempts to replicate with the next server on the ordered site list (Step 487), and the replication application 114 again determines whether or not the replication was successful (Step 485).

Figure 6:
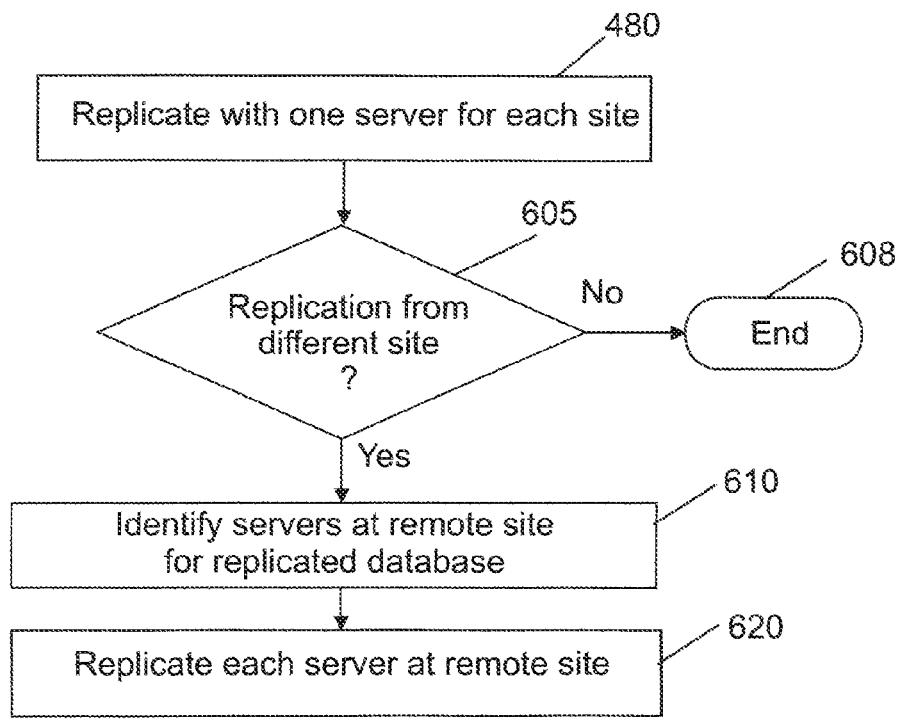
FIG. 6 is a flow diagram of a method for replicating a replicated database at other servers within the same remote site according to an embodiment of the present invention.

FIG. 6 is a flow diagram of a method for replicating a replicated database at other servers within the same remote site according to an embodiment of the present invention. Following the replication with one server for each site (Step 480), the replicated server, for example server 150 from site B determines whether it has been replicated from the same site or a different site (Step 605).

If the replication was from the same site (N at step 605), then the replication ends (Step 608). If the replication was from a different site (Y at step 605), then the replication application 154 at the replicated server 150 identifies other servers to be replicated with at the remote site B where the replicated server 150 is located (Step 610). The replicated server may make this determination by checking the look up table, for example.

The replicated server 150 replicates with each other server 140, 160 at the remote site B (Step 620).

Figure 7:
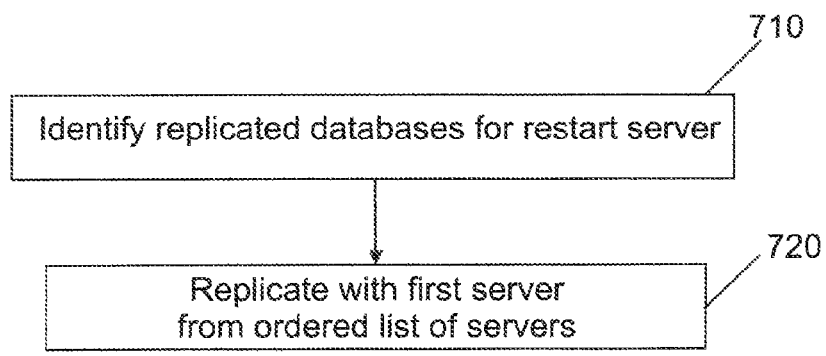
FIG. 7 is a flow diagram of a method for replicating a server returning to service at a remote site according to an embodiment of the present invention.

FIG. 7 is a flow diagram of a method for replicating a server returning to service at a remote site according to an embodiment of the present invention. During the restart operations of a server returning to service, the returning server identifies databases that are replicated on the restart server (Step 710). Then restart server replicates with the first server from the ordered site list of the restart server for the replicated database (Step 720).

The invention can take the form of an entirely hardware embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable medium having a machine-executable program of instructions, which when executed by a machine, such as a computer, performs the steps of the method. This program product may be stored on any of a variety of known machine-readable medium, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A computer-based method for inter-site database replication, comprising:
a replicating server tracking other servers that it needs to replicate with and the sites where said other servers are located;
in response to an indication to replicate, the replicating server determining whether each of the other servers is at the same location as the replicating server or a different location from the replicating server;
the replicating server replicating with each of the other servers at the same site as the replicating server; and
the replicating server replicating with only one of the servers at each different site;
wherein the replicated server at each different site replicates with the other servers at the site of the replicated server, wherein the step of the replicating server replicating with only one of the other servers at each different site, comprises:
the replicating server creating an ordered site list of servers for each remote site with servers that the replicating server needs to replicate with, wherein an order of the ordered site list of servers is database dependent;
the replicating server attempting to replicate with a first one of the servers on each one of the ordered site lists of servers;
the replicating server discontinuing replication with servers on each of the site lists of servers with a successful replication; and
the replicating server attempting to replicate with a next one of the ordered servers on each of the ordered site lists of servers without a successful replication, wherein the ordered site list is creating by hashing a combination of each remote server name and each replicated database name.

2. The method of claim 1, wherein the step of a replicating server tracking other servers that it needs to replicate with and the sites where said other servers are located, comprises:
storing the names of databases to be replicated, the names of servers to be replicated with for each database, and the site for each server; and
retrieving the stored database names, server names and server sites for each replicated database.

3. The method of claim 2, wherein the names of databases to be replicated, the names of servers to be replicated with for each database, and the site for each server are stored on a look up table.

4. The method of claim 1, wherein the step of the replicating server determining whether each of the other servers is at the same location as the replicating server or a different location from the replicating server, comprises:
storing site indications for each server to be replicated with; and
comparing the stored site indications.

5. The method of claim 1, wherein the indication to replicate comprises determining that a change has been made to a database.

6. The method of claim 1, wherein the step of the replicated server at each different site replicates with the other servers at the site of the replicated server comprises:
the replicated server determining whether the replicated server has been replicated from the same site or a different site;
upon determining that the replicated server has been replicated from a different site, the replicated server identifying other servers at the site of the replicated server to be replicated with; and
the replicated server replicating with the identified other servers at the site of the replicated server.

7. A computer system for inter-site database replication, comprising:
a plurality of networked servers;
at least one processor in each of the plurality of servers;
at least one memory in each of the plurality of servers operably connected to the at least one processor in the respective server;
a program of instruction encoded on the at least one memory of each of the plurality of servers and executable by the processor of each of at least one processors of the each of the plurality of servers, the program of instruction comprising:
program instructions to track other servers that the server needs to replicate with and the sites where the other servers are located;
program instructions to determine whether each of the other servers is at the same location as the server or a different location from the server in response to an indication to replicate;
program instructions to replicate with each of the other servers at the same site as the server;
program instructions to replicate with only one of the servers at each different site;
and program instructions to replicate with each other server at the same site upon being replicated by a server from a different site; and
an ordered site list of servers for each remote site for each replicated database encoded on the at least one memory of each server, the ordered site list of servers identifying, for the respective site, each server at the site to be replicated with and an order for replication of each server, the order of the ordered site list of servers being database dependent.

8. The computer system of claim 7, wherein the servers are connected with servers at a different site by a WAN connector.

9. The computer system of claim 7, wherein the program of instruction further comprises:
program instructions to create the ordered site lists of servers;

program instructions to replicate with a first one of the servers on each one of the ordered site lists of servers;

program instructions to discontinue replication with servers on each of the site lists of servers with a successful replication; and program instructions to replicate with a next one of the ordered servers on each of the ordered site lists of servers if there is not a successful replication with a prior one of the ordered servers.

10. The computer system of claim 7, further comprising a look up table encoded on the at least one memory of each server, the look up table identifying each database to be replicated, each server with the database to be replicated, and a site where each server is located.

11. The computer system of claim 10, wherein the program of instruction further comprises:

program instructions to store the names of databases to be replicated, the names of servers to be replicated with for each database, and the site for each server on the look up table; and program instructions to retrieve the stored database names, server names and server sites for each replicated database from the look up table.

12. The computer system of claim 7, wherein the program of instruction further comprises:

program instructions to determine whether a replicated server has been replicated from the same site or a different site;

program instructions to identify other servers at the site of the replicated server to be replicated with, upon determining that the replicated server has been replicated from a different site; and program instructions to replicate with the identified other servers at the site of the replicated server.

13. A program product, comprising a tangible computer readable storage device having encoded thereon a computer executable program of instructions, comprising:

program instructions to track, on a server, other servers that the server needs to replicate with and the sites where the other servers are located;

program instructions to determine whether each of the other servers is at the same location as the server or a different location from the server in response to an indication to replicate a database;

program instructions to replicate with each of the other servers at the same site as the server;

program instructions to replicate with only one of the servers at each different site;

program instructions to replicate with the other servers at the site of the server upon being replicated with by a server from a different site; and program instructions to create an ordered site list of servers for each remote site with servers that the server needs to replicate with, wherein an order of the ordered site list of servers is database dependent, wherein there are replicas for multiple databases shared between servers.

14. The program product of claim 13 wherein the program instructions to replicate with only one of the other servers at each different site, further comprises:

program instructions to replicate with a first one of the servers on each one of the ordered site lists of servers;

program instructions to discontinue replication with servers on each of the site lists of servers with a successful replication; and program instructions to replicate with a next one of the ordered servers on each of the ordered site lists of servers without a successful replication.

15. The program product of claim 13, wherein the program instructions to track other servers that the server needs to replicate with and the sites where the other servers are located, comprises:

program instructions to store names of databases to be replicated, names of servers to be replicated with for each database, and the site for each server; and program instructions to retrieve the stored database names, server names and server sites for each replicated database.

16. The program product of claim 13, wherein the program instructions to determine whether each of the other servers is at the same location as the server or a different location from the server, comprises:

program instructions to store site indications for each server to be replicated with; and program instructions to compare the stored site indications.

17. The program product of claim 13, wherein the program instructions to replicate with the other servers at the site of the server when the server is replicated from a different site comprises:

program instructions to determine whether the server has been replicated from the same site or a different site;

program instructions to identify other servers at the site of the server to be replicated with upon determining that the server has been replicated from a different site; and program instructions to replicate with the identified other servers at the site of the server.

* * * * *